Figure 4:
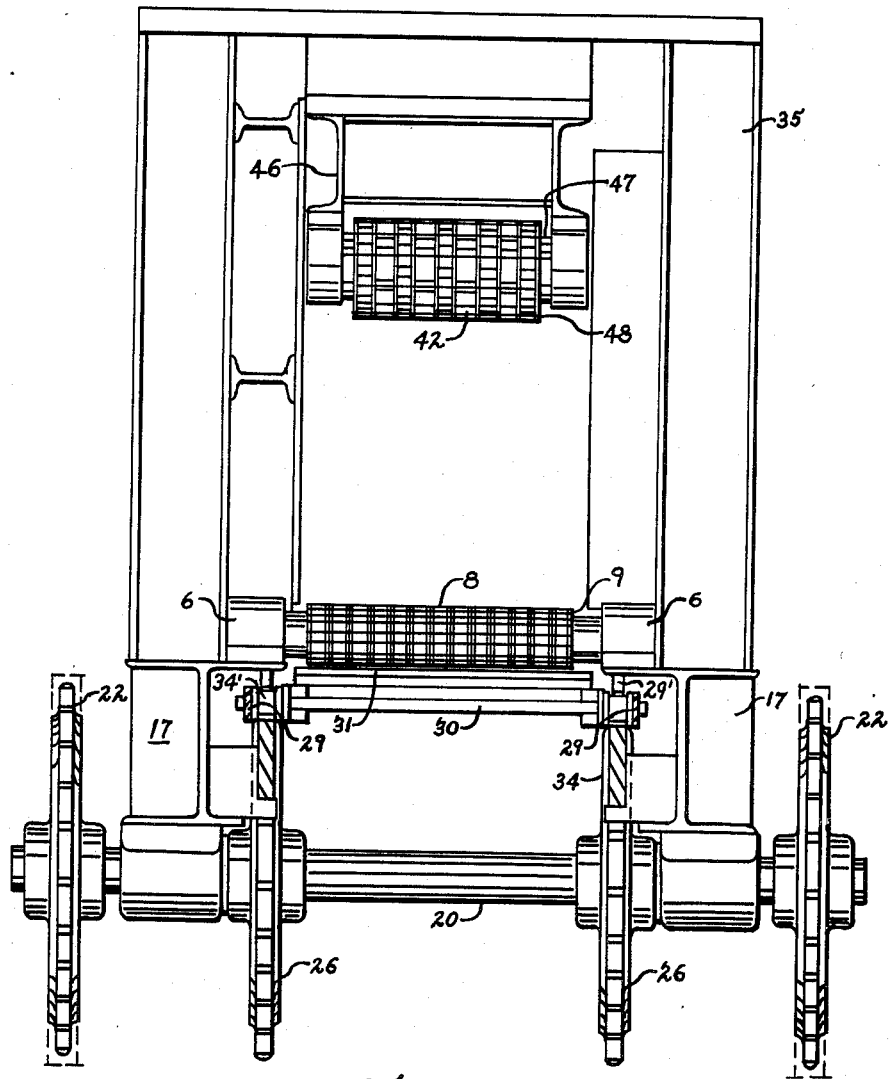

May 10, 1960
D. E. BROWN
2,936,008
MOBILE WHOLE-TREE WOOD-CHIPPER UNIT
Filed April 17, 1957
3 Sheets-Sheet 1
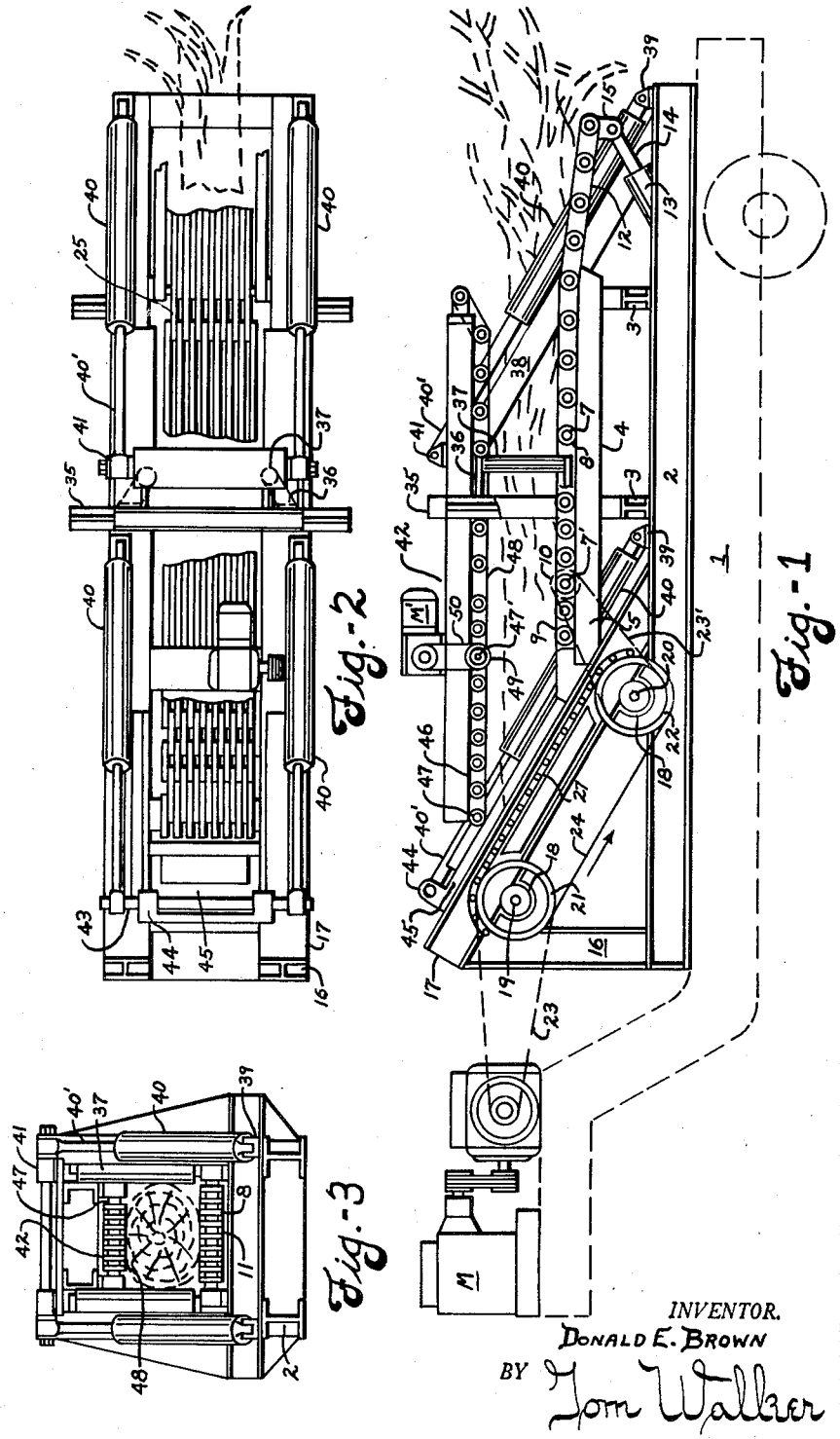
INVENTOR.
DONALD E. BROWN
BY Tom Walker May 10, 1960 D. E. BROWN 2,936,008
MOBILE WHOLE-TREE WOOD-CHIPPER UNIT
Filed April 17, 1957 3 Sheets-Sheet 2

INVENTOR.
DONALD E. BROWN
BY Tom Walker

May 10, 1960

D. E. BROWN 2,936,008

MOBILE WHOLE-TREE WOOD-CHIPPER UNIT

Filed April 17, 1957

3 Sheets-Sheet 3

INVENTOR.
DONALD E. BROWN
BY Tom Walker

United States Patent Office 2,936,008
Patented May 10, 1960

2,936,008

MOBILE WHOLE-TREE WOOD-CHIPPER UNIT

Donald E. Brown, Farmingdale, N.J., assignor to The Bauer Bros. Company, Springfield, Ohio, a corporation of Ohio Application April 17, 1957, Serial No. 653,495

6 Claims. (Cl. 144—162)

This invention relates to a novel wood chipper device, and more particularly to a mobile wood chipper unit which is capable of completely reducing whole trees into chips at the place where they are felled.

Wood chipping is an important initial operation in converting trees into wood pulp. In the absence of the present invention, the normal procedure involves felling the trees in the forests, removing all branches therefrom, and sawing the trunks of the trees into relatively short lengths so that they can be shipped to the mill. At this point the tree lengths are de-barked and reduced to chips by relatively expensive means.

Many problems present themselves in this prior art procedure. The necessity for removing all branches from each tree results in a time consuming and laborious operation which is of a costly nature. The branches which are removed are a total waste and present a disposal problem. The tree trunks must be sectioned in order to enable their ready transport for the chipping operation. These sections, moreover, are bulky and take up a lot of shipping space. This does not afford an efficient or economical use of transportation services available.

The unit afforded by the present invention presents a substantial economy and efficiency in the art of reducing trees to wood chips for the purpose of producing wood pulp. The invention apparatus comprises a mobile platform on which is mounted a feed assembly which is adapted to receive the butt end of a tree, upon it being felled in the forests. The feed assembly provided includes means which carries the tree, including all its branches, butt first to a moving bank of cutter elements disposed in angular relation thereto. As the tree is moved in toward the moving cutter elements, means are provided which folds the branches into the trunk of the tree. At this point an additional drive means is provided which engages the uppermost surface of the tree trunk and drives the tree into the cutter elements. The cutter elements are provided with blades arranged to cut thin angular slices from the tree as it is fed into the cutter section. The slices are so dimensioned that as they fall from the cutter section they are broken into small wood chips which are loaded on the spot where the tree is felled and hauled to the mill for proper reduction to wood pulp. There is absolutely no waste left from the tree in the process and accordingly there is no great litter or disposal problem. Also, the need for preliminary removal of the tree branches and the sectioning of the tree trunk has been eliminated by the improved wood chipper unit as provided by the invention, saving the normal time and cost involved in such operations. Transportation savings is substantial since the tree as reduced to chips can be easily loaded and transported to the mill.

The object of the invention is to simplify the construction as well as the means and mode of operation of tree chippers, whereby such chippers may not only be economically manufactured, but will be more efficient and satisfactory in use, adaptable to a wide variety of applications, and be unlikely to get out of repair.

Another object of the invention is to provide a new and improved wood chipper unit of a mobile nature.

A further object of the invention is to provide a unit which enables whole trees to be reduced to wood chips at the place where they are felled without appreciable waste and with a minimum of labor and cost involved, so that the trees are shipped from the forests as wood chips.

A further object of the invention is to provide a novel mobile wood chipper apparatus including means whereby a tree, as it is felled, may be introduced into a feeder assembly and conveyed thereby into an angled bank of cutter knives and be completely reduced to chips in a quick and efficient manner.

An additional object of the invention is to provide a novel mobile wood chipper unit which can be driven to the place where trees are being felled and be self powered to reduce whole trees to a pile of wood chips at that point through means including chain driven conveyer, drive and cutting means of an integrated nature.

A further object of the invention is to provide a tree chipper possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention.

Figure 5:
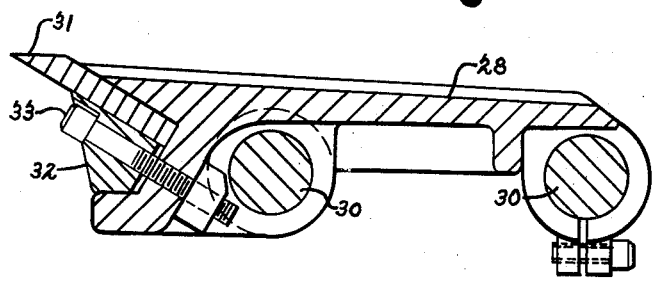
Figure 6:
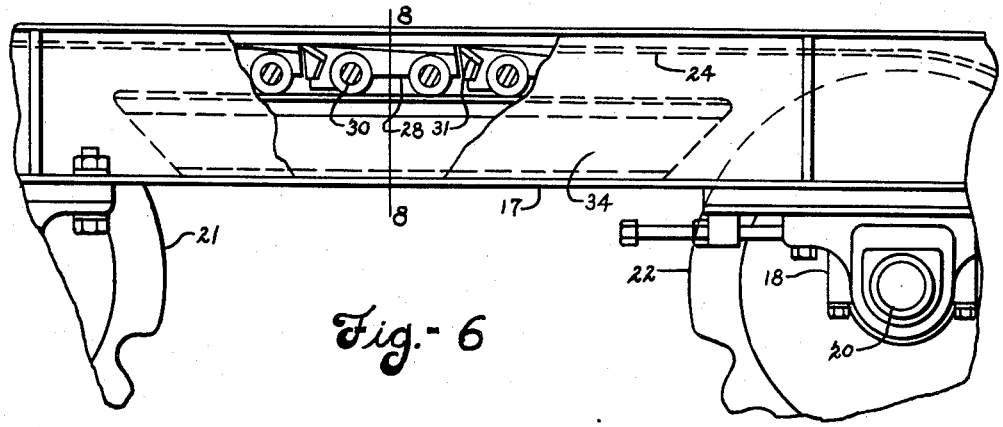
Figure 7:
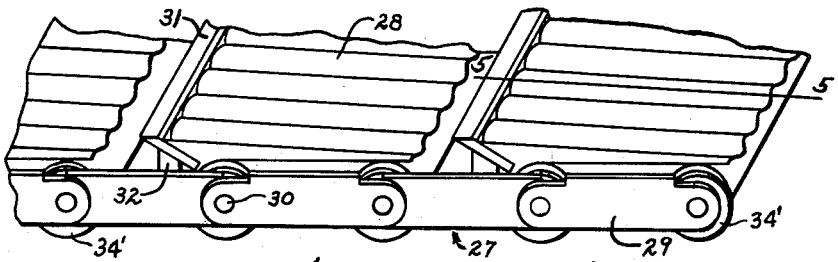
Figure 8:
Figures 9, 10:
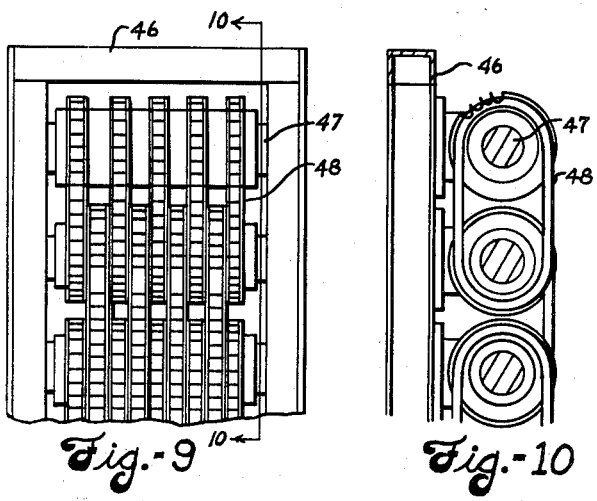

Fig. 1 shows an elevation of a practical embodiment of a mobile wood chipper unit as provided by the invention, Fig. 2 shows a fragmentary top view of the apparatus of Fig. 1, Fig. 3 shows a feed end elevation of the apparatus of Fig. 1, Fig. 4 is a fragmentary sectional view of the cutter section of the apparatus of Fig. 1, Fig. 5 is a cross-sectional view taken on line 5—5 of Fig. 7, Fig. 6 is a detail longitudinal section of a cutter segment employed, Fig. 7 is a fragmentary top perspective view of the continuous cutter section employed in the embodiment of the invention illustrated, Fig. 8 is a sectional view taken on line 8—8 of Fig. 6, and Fig. 9 is a fragmentary view showing the construction of the upper and lower conveyor belts, Fig. 10 is a section taken on line 10—10 of Fig. 9.

Like parts are indicated by similar characters of reference throughout the several views.

The invention can best be described with reference to the practical embodiment thereof shown in the drawings. The embodiment shown consists of a mobile base 1 of a trailer type which can be hitched to a truck or tractor and transported to any place desired. Motors M having hydraulic pumps and gear reduction units connected therewith are mounted at the forward end of the trailer base 1 along with a generator to afford a power source for the mechanism provided. A rectangular framework 2 sits on the base 1 rearwardly of the motors and the generator. Longitudinally spaced and transversely arranged beams 3 mounted on the framework 2 provide a support of the feeder section 4 in vertically spaced relation to the framework 2.

The feeder section 4 consists of parallel longitudinal support beams 5 providing bearings for a series of transversely disposed parallel sprocket shafts 7. The shafts 7 have sprockets 8 mounted thereto in lateral and longitudinally spaced relation. The sprockets 8 mount continuous sprocket chains 9 thereon so as to dispose them longitudinally relative the framework 2. A main drive sprocket 10 is mounted to a sprocket shaft 7' spaced outwardly of the feeder section 4.

Rearwardly of the feeder section 4 is a similarly constructed loader section 11 having its supporting brackets 12 pivotally connected to the rearward extremities of the frame 4. Hydraulic control cylinders 13 are mounted to the framework 2 adjacent the rear end thereof in transverse alignment and have rod members 14 extending therefrom into pivotal connection with brackets 15 depending from the rear ends of the supporting brackets 12. The inclination of the loader section 11 and its relation relative the feeder section 4 may be controlled at all times by means of connections (not shown) from hydraulic cylinders 13 to the hydraulic control pumps associated with the motors M. Thus, both the loader and feeder sections provide transversely spaced and longitudinally arranged sprockets with continuous drive chains mounted thereon.

Adjacent the forward end of the framework 2, to either side thereof, is a vertical support beam 16 having its top surface inclined rearwardly toward the framework 2. Brace bars 17 are fixed at their upper forward ends to this inclined surface of the vertical supports 16 and at their lower rearmost extremities to the framework 2. Spaced brackets 18 depend from the bars 17 in longitudinal and transverse alignment, the respective pairs of transversely aligned brackets 18 affording bearing supports for shafts 19 and 20 respectively. Pairs of laterally spaced and longitudinally aligned sprockets 21 and 22 are respectively mounted to the shafts 19 and 20, one pair being in the plane of the main drive sprocket 10 of the feeder section 4. As shown in Fig. 1 of the drawings, the motor M drives the uppermost sprocket 21 of the last mentioned pair through a chain drive 23. A continuous chain 24 connects the sprockets 21 and 22 to drive sprocket 22 thereby and through a continuous chain connection 23' between the sprocket 22 and the main drive sprocket 10 of the feeder section 4, the sprocket 10 is also driven. In this manner a continuous drive is afforded the sprockets and sprocket chains of the feeder section 4, through the drive of the sprocket shaft 7'. Additional linking drive chains 25 (Fig. 2) of a continuous nature are provided to link the feeder section sprockets and the forward loader section sprockets so that as the feeder chain drive is effected, the loader chain drive is being continuously driven.

Mounted to the respective sprocket shafts 19 and 20 immediately inwardly of their supporting brackets 18 are cutter drive sprockets 26 (Fig. 4) which, are longitudinally aligned. Continuous chains 27 connect the aligned sprockets 26. Cutter bar segments 28 (Figs. 5 and 7) straddle mount at their respective ends to each pair of transversely opposed link elements 29 of the chains 27, seating to rods 30 connecting the opposing links and providing the link pin connections for succeeding links in the continuous chains 27.

As shown in Fig. 5 of the drawings, each cutter bar segment 28 has an inclined and forwardly projecting knife blade 31 clamped in a recess in the forward end thereof by means of a wedge 32 seating in the recess and clamping the blade 31 to the cutter segment body. A threaded bolt 33 engages through the wedge 32 into the body of the cutter segment to releasably fix the blade in its projected position. The upper surface of the cutter segment is sloped away from the projecting knife blade so as to afford no interference to its cutting action. In this manner the continuous chains 27 are connected by cutter bar segments disposed in continuous spaced relation thereabout and affording successive projecting inclined knife blades outwardly thereof. Fixed inwardly of each brace bar 17 is a vertical plate 34 (Figs. 6 and 8) affording a bearing surface for the respectively associated continuous chain 27 during its upper or cutting run. Carried by chain 27 are rollers 34' which bear upon plate 34, while held down by upper guides 29'. Thus chain 27 is maintained against movement out of its normal plane of operation.

A vertical rectangular frame 35 (Fig. 4) encloses the feeder section 4 in a transverse sense centrally of the framework 2 to provide vertical supports for brackets 36 (Fig. 2) which are disposed at an angle relative the feed section. The brackets 36 mount rollers 37 (Fig. 1) vertically to either side of the feeder section 4 for purposes to be described. Fixed to the rear of framework 2, to either side thereof, are inclined brace bars 38 having their ends connected respectively to the upper ends of the vertical supports of frame 35.

Brackets 39 (Figs. 1 and 3) are rectangularly arranged in fixed relation to the longitudinal members of the framework 2. A housing 40 is connected at its lowermost extremity to each bracket 39. Each housing accommodates hydraulic fluid controlling piston members having piston rods 40' connected thereto extending outwardly of the upper ends of the respective housings. The upper ends of the rear piston rods 40' pivotally connect to brackets 41 fixed to the upper surface of a suspended drive unit 42. The forward piston rods 40' pivotally connect to the respective lateral extremities of a shaft 43 mounted in brackets 44 integral with a guide plate 45 on the forward end of the rectangular drive frame 46 of the drive unit 42. The undersurface of the guide plate 45 rests on the forward brace bars 17 which mount the cutter section in suspended relation thereto.

Transversely of and within the drive frame 46 are mounted sprocket shafts 47 in longitudinally spaced relation and having their respective ends bearing in the drive frame. Sprocket elements are fixed to each shaft 47 in spaced relation to each other and in aligned relation to sprockets on other shafts 47. Sprocket drive chains 48 are mounted to the aligned sprockets so as to provide a continuous driving undersurface to the drive frame structure. One of the sprocket shafts 47' (Fig. 1) extends laterally of the drive frame 46 and has an outer drive sprocket 49 fixed thereto which is driven from a motor M' mounted to the upper surface of the drive frame 46 and connected therewith by a continuous drive chain 50. Suitable power supply is afforded the motor M' by the generator and as it is energized, it drives the sprocket shaft 47' and the sprockets connected thereto to drive the continuous chains 48. The hydraulic cylinders previously mentioned are connected to the hydraulic pumps associated with the motor M which is actuated by suitable controls (not shown) to pump fluid to and from the cylinders 40 to raise and lower the drive frame 46 as desired and in a manner to be described.

Thus an illustrative practical embodiment of the invention has been shown and the application and use thereof is as follows. Its most advantageous application is to chip whole trees in the forest where they are felled. The mobile base 1, as provided, permits it to be hitched to a vehicle and drawn to the area where the trees are being felled. As a tree is felled, it is pulled over to the chipper unit close by and placed, butt end first, on the loader section 11 at the rear of the base 1. As mentioned previously, the inclination of this loader section is controlled as desired by the hydraulically controlled supporting rods 14, suitable controls (not shown) being afforded to control the flow of fluid to and from the cylinders 13. The conveyor chains of the loader section support and convey the whole tree, butt first, onto the feeder section 4 and the feeder chains 9 provide the surface thereof. As the tree is conveyed by the feeder section chains, the rollers 37 to either side of the feeder section fold the branches into the trunk of the tree assisted by the side support structure provided therefor. As the butt end of the tree approaches the cutter section which is vertically inclined in the path thereof, the hydraulic pumps provide control fluid to the pistons in the respective cylinders 40 to thereby insure that the rods 40' are simultaneously retracted. The drive unit 42, being connected to the four piston rods 40', is thereby lowered into firm contacting engagement with the upper surface of the tree trunk. Since the undersurface of the drive unit is provided by the continuous chains 48, they engage the tree trunk to drive it continuously into the cutter section, butt end first.

As has been described, for cutting efficiency the continuous chains 27 of the cutter unit are transversely connected in continuous fashion by bar elements affording projecting knife blades inclined relative to the tree trunk as it is driven into the cutter section. Since there is a common drive of all the chain drive elements in the assembly, the speed of the knives and the speed of the conveyor chains will be such that the tree is fed into the knives at exactly the same rate that the knives will cut slices off the tree as it is fed thereto. The guide plate 45 at the forward end of the drive unit carries a knife in the nature of a stationary steel plate set to cooperate with the inclined moving knives 31 as the drive unit is lowered in clamping relation to the tree.

The slices produced by the unit are fragile and are reduced to chips on the slightest impact. Thus, a whole tree may be quickly and efficiently reduced at the spot where it is felled. There is relatively little waste and litter. The relatively simple and economical unit described may be provided in a variety of sizes while retaining its relative simplicity and economy of operation with a high degree of efficiency. Much expense, time and labor is eliminated in the process of reducing trees. It should be noted that each knife blade 31 cuts a slice from the tree, as it travels in its normal path. Thus, multiple slices are produced simultaneously as successive knife blades traverse the tree being reduced.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A mobile wood chipper comprising, a feeder section consisting of longitudinally and transversely arranged sprockets, chain elements of a continuous nature mounting to said sprockets and affording a horizontal bed for engaging and conveying a whole tree, vertically extending roller means fixed to either side of said feeder section to contain and fold the branches of the tree into the trunk thereof, overhead suspended means arranged in generally parallel relation to said feeder section and adjustable downward to engage and contain the tree at the upper surface thereof and including means to positively drive the tree, selectively operable means to raise and lower said last named means and cutter means fixed transversely of and in angular relation to said feeder section and operable to effect the reduction of the whole tree to chips as it is fed thereto.

2. A mobile wood chipper comprising, a trailer type platform, a feeder section including a series of longitudinally arranged and transversely spaced sprocket driven chains, cushioning means supporting the entrance end thereof to accommodate the introduction of the butt end of a tree thereon, vertically extending roller means fixed to said platform to either side of said feeder section, folding the tree branches into the trunk thereof as it is drawn over the platform, transversely spaced aligned sprocket driven chains arranged at an angle to said platform at the end of said feeder section, and transversely mounted knife elements connecting said chains and operable to angularly attack said tree as it is continuously fed thereto to cause the tree to be completely reduced to chips with no waste resulting.

3. A wood chipper unit comprising, a platform, a frame seated to said platform supporting transversely opposed brackets, parallel sprocket shafts bearing at their respective ends in said opposed brackets and mounting sprockets thereto in transversely and longitudinally spaced fashion, continuous chains mounted to longitudinally aligned sprockets to be driven thereby longitudinally of said platform, roller means mounted vertically of said platform to either side of said continuous chains and vertically relative thereto, an inclined support means at the inner extremity of said chains extending to either side of said platform, brackets mounted thereto to either side thereof in transversely aligned relation, shafts mounted for rotation in said last mentioned brackets, sprockets mounted to said shafts in laterally spaced and longitudinally aligned relation, continous chains connecting said last mentioned sprockets in driven relation thereto, and cutter bar elements arranged in continuous parallel fashion and connecting said chains throughout the length thereof, said cutter elements having the cutting edges thereof disposed at an angle relative said platform and moving in the path of a tree as conveyed by the first mentioned continuous chains to effect angular cuts thereof in continuous fashion, said rollers folding the branches of the tree into the trunk thereof as it is conveyed to the cutter elements whereby the whole tree may be quickly and efficiently reduced to chips without any resulting waste.

4. A mobile wood chipper unit comprising, a mobile platform, feeder means mounted at one end thereof including a series of sprockets and chains longitudinally arranged for simultaneous driving thereof to engage the butt end of a tree and carry it forward on the platform, a drive frame, powered means connected to said platform and normally supporting said frame in selected spaced relation to said feeder means, a series of sprockets and chains longitudinally mounted to said drive frame so as to provide a continuous chain drive means at the undersurface thereof, roller means mounted vertically of said platform to either side of said feeder means to fold the branches of the tree into the trunk thereof as it is conveyed by said feeder means, a support means following said feeder means inclined to the surface of said platform, shaft elements mounted in depending relation to said support means for rotation relative thereto and in generally parallel relation, sprockets mounted to the respective ends of said shafts in aligned relation, continuous chains connecting the aligned drive sprockets at the respective ends of said shafts and having transversely connecting parallel bar cutter elements mounted thereto, said bar elements having knife blades projecting therefrom and angularly related to the tree trunk as it is conveyed thereto by said feeder means, power means simultaneously connected to said feeder means and said drive means and said cutter elements for conjoint operation thereof to drive the tree into said knife blades and completely reduce it thereby without any resulting waste.

5. A mobile whole-tree wood-chipper unit, comprising a platform, horizontal conveyor means on said platform, means for adjusting the height of the infeed forward end of the platform and conveyor, chipping means at the other end of said platform comprising chain connected knives, the flight of the knives being at an angle to the platform and conveyor means thereon, an overhead conveyor means spaced in parallel relation to the first said conveyor means, said overhead conveyor means being rearward of the first conveyor means, the rear end of the overhead conveyor means being adjacent the top flight of the chain carried wood-chipper means, with means for lowering the overhead conveyor relative to but in parallel relation to the first mentioned conveyor means, and means for transmitting motion to the upper conveyor means from one motor and the lower conveyor means and the chipping means in timed relation from another motor.

6. A mobile whole-tree wood-chipper unit, comprising a platform, horizontal conveyor means on said platform, means for adjusting the height of the forward infeed end of the conveyor, chipping means at the other end of said platform comprising chain connected knives, the flight of the knives being at an angle to the platform and conveyor means thereon, an overhead conveyor means spaced in parallel but adjustable relation to the first said conveyor means, said overhead conveyor means being rearward of the first conveyor means, the rear end of the overhead conveyor means being adjacent the top flight of the chain carried wood-chipper means, with means for driving the lower conveyor and wood chipping means to transport the end of a whole tree to the wood chipping means and independent means for driving the upper conveyor means after the tree has been advanced to the wood chipping means.

References Cited in the file of this patent

UNITED STATES PATENTS

| | | |
|---|---|---|
| 427,818 | Young | May 13, 1890 |
| 939,438 | Nielsen | Nov. 9, 1909 |
| 1,830,245 | Rowe | Nov. 3, 1931 |
| 2,310,152 | Ronning | Feb. 2, 1943 |
| 2,418,726 | Rogers | Apr. 8, 1947 |
| 2,559,701 | Becker | July 10, 1951 |
| 2,570,926 | Elmendorf | Oct. 9, 1951 |
| 2,616,501 | Smith | Nov. 4, 1952 |
| 2,634,062 | Forman | Apr. 7, 1953 |
| 2,652,077 | Alexander | Sept. 15, 1953 |
| 2,655,961 | McComb | Oct. 20, 1953 |

FOREIGN PATENTS

| | | |
|---|---|---|
| 73,191 | Germany | Jan. 30, 1894 |